United States Patent
Wang et al.

(10) Patent No.: US 9,312,064 B1
(45) Date of Patent: Apr. 12, 2016

(54) METHOD TO FABRICATE A MAGNETIC HEAD INCLUDING ION MILLING OF READ GAP USING DUAL LAYER HARD MASK

(71) Applicant: Western Digital (Fremont), LLC, Fremont, CA (US)

(72) Inventors: Miao Wang, San Jose, CA (US); Wei Gao, Fremont, CA (US); Lingyun Miao, Fremont, CA (US); Hai Sun, Milpitas, CA (US); Ming Mao, Dublin, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/635,953

(22) Filed: Mar. 2, 2015

(51) Int. Cl.
*B44C 1/22* (2006.01)
*H01F 41/02* (2006.01)

(52) U.S. Cl.
CPC ........................................ *H01F 41/02* (2013.01)

(58) Field of Classification Search
CPC ........... H05K 2203/092; G11B 5/3116; G11B 5/3163; H01F 41/02
USPC ................ 216/22, 41, 47; 29/603.14, 603.15; 204/192.34
See application file for complete search history.

(56) References Cited

U.S. PATENT DOCUMENTS

| | | |
|---|---|---|
| 4,502,914 A | 3/1985 | Trumpp et al. |
| 4,508,579 A | 4/1985 | Goth et al. |
| 5,199,090 A | 3/1993 | Bell |
| 5,612,255 A | 3/1997 | Chapple-Sokol et al. |
| 5,618,383 A | 4/1997 | Randall |
| 5,795,830 A | 8/1998 | Cronin et al. |
| 5,874,010 A | 2/1999 | Tao et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,063,688 A | 5/2000 | Doyle et al. |
| 6,073,338 A | 6/2000 | Liu et al. |
| 6,078,479 A | 6/2000 | Nepela et al. |

(Continued)

OTHER PUBLICATIONS

Miao Wang, et al., U.S. Appl. No. 13/929,633, filed Jun. 27, 2013, 24 pages.

*Primary Examiner* — Duy Deo
*Assistant Examiner* — Maki Angadi

(57) ABSTRACT

A first layered structure includes a magnetic layer, a first hard mask layer, a second hard mask layer, and a first stepping layer. The first stepping layer is etched through to create a sidewall. A mask-width definition layer is deposited on and adjacent to the sidewall, until a mask-width definition layer thickness is achieved adjacent to the sidewall. The mask-width definition layer is removed except on the sidewall. The first stepping layer is removed. The second hard mask layer is etched away, except for a remainder of the second hard mask layer beneath the mask-width definition layer. The first hard mask layer is etched away around the remainder of the second hard mask layer, to form a dual layer hard mask comprising the remainder of the second hard mask layer and the remainder of the first hard mask layer. The magnetic layer is ion milled around the dual hard mask.

20 Claims, 5 Drawing Sheets

(56) References Cited

U.S. PATENT DOCUMENTS

| | | |
|---|---|---|
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,291,137 B1 | 9/2001 | Lyons et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,423,475 B1 | 7/2002 | Lyons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,472,107 B1 | 10/2002 | Chan |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,566,280 B1 | 5/2003 | Meagley et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,653,735 B1 | 11/2003 | Yang et al. |

(56) References Cited

U.S. PATENT DOCUMENTS

| | | |
|---|---|---|
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,703,312 B2 | 3/2004 | Golz et al. |
| 6,704,158 B2 | 3/2004 | Hawwa et al. |
| 6,706,571 B1 | 3/2004 | Yu et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,131 B1 | 10/2004 | Hesselink et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,862,798 B2 | 3/2005 | Kruger et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,875,703 B1 | 4/2005 | Furukawa et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,893,972 B2 | 5/2005 | Rottstegge et al. |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,015,124 B1 | 3/2006 | Fisher et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,084,071 B1 | 8/2006 | Dakshina-Murthy et al. |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,115,525 B2 | 10/2006 | Abatchev et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,129,180 B2 | 10/2006 | Sandhu et al. |
| 7,131,346 B1 | 11/2006 | Buttar et al. |
| 7,133,230 B2 | 11/2006 | Saga et al. |
| 7,133,253 B1 | 11/2006 | Seagle et al. |
| 7,134,182 B2 | 11/2006 | Chang et al. |
| 7,134,185 B1 | 11/2006 | Knapp et al. |
| 7,154,715 B2 | 12/2006 | Yamanaka et al. |
| 7,155,732 B2 | 12/2006 | Rausch et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,291,560 B2 | 11/2007 | Parascandola et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,345,370 B2 | 3/2008 | Furukawa et al. |

(56) References Cited

U.S. PATENT DOCUMENTS

| | | |
|---|---|---|
| 7,349,170 B1 | 3/2008 | Rudman et al. |
| 7,349,179 B1 | 3/2008 | He et al. |
| 7,354,664 B1 | 4/2008 | Jiang et al. |
| 7,355,813 B2 | 4/2008 | Kruger et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,380,332 B2 | 6/2008 | Bedell et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,531,456 B2 | 5/2009 | Kwon et al. |
| 7,542,246 B1 | 6/2009 | Song et al. |
| 7,547,640 B2 | 6/2009 | Abatchev et al. |
| 7,551,406 B1 | 6/2009 | Thomas et al. |
| 7,552,523 B1 | 6/2009 | He et al. |
| 7,554,767 B1 | 6/2009 | Hu et al. |
| 7,562,436 B2 | 7/2009 | Jayasekara |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,666,578 B2 | 2/2010 | Fischer et al. |
| 7,672,080 B1 | 3/2010 | Tang et al. |
| 7,672,086 B1 | 3/2010 | Jiang |
| 7,684,160 B1 | 3/2010 | Erickson et al. |
| 7,687,408 B2 | 3/2010 | Abatchev et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |

(56) References Cited

U.S. PATENT DOCUMENTS

| | | | |
|---|---|---|---|
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,617,408 B2 | 12/2013 | Balamane et al. |
| 8,619,512 B1 | 12/2013 | Yuan et al. |
| 8,623,771 B2 | 1/2014 | Yi |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,889,018 B2 * | 11/2014 | Mao ............... G11B 5/3116 216/22 |
| 2002/0142603 A1 | 10/2002 | Chang et al. |
| 2006/0046422 A1 | 3/2006 | Tran et al. |
| 2006/0067001 A1 | 3/2006 | Hsu et al. |
| 2006/0234483 A1 | 10/2006 | Araki et al. |
| 2006/0258162 A1 | 11/2006 | Abatchev et al. |
| 2006/0273456 A1 | 12/2006 | Sant et al. |
| 2006/0281266 A1 | 12/2006 | Wells |

(56) References Cited

U.S. PATENT DOCUMENTS

| | | |
|---|---|---|
| 2007/0159720 A1 | 7/2007 | Sohn et al. |
| 2007/0165495 A1 | 7/2007 | Lee et al. |
| 2008/0081461 A1 | 4/2008 | Lee et al. |
| 2008/0090418 A1 | 4/2008 | Jeon et al. |
| 2008/0149809 A1 | 6/2008 | Hamann et al. |
| 2009/0004875 A1 | 1/2009 | Shen et al. |
| 2009/0053651 A1 | 2/2009 | Hatakeyama et al. |
| 2009/0110960 A1 | 4/2009 | Tanaka |
| 2009/0266790 A1 | 10/2009 | Balamane et al. |
| 2010/0024201 A1 | 2/2010 | Le et al. |
| 2010/0290157 A1 | 11/2010 | Zhang et al. |
| 2011/0086240 A1 | 4/2011 | Xiang et al. |
| 2011/0089140 A1 | 4/2011 | Hong |
| 2011/0171804 A1 | 7/2011 | Wang et al. |
| 2012/0111826 A1 | 5/2012 | Chen et al. |
| 2012/0125884 A1 | 5/2012 | Chung et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0164659 A1 | 6/2013 | Keller et al. |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0038399 A1 | 2/2014 | Chang et al. |
| 2014/0154529 A1 | 6/2014 | Yang et al. |
| 2014/0175050 A1 | 6/2014 | Zhang et al. |

\* cited by examiner

METHOD TO FABRICATE A MAGNETIC HEAD INCLUDING ION MILLING OF READ GAP USING DUAL LAYER HARD MASK

BACKGROUND

Magnetic hard disk drives retrieve and/or store data in computers and other consumer electronics devices. A magnetic hard disk drive includes one or more heads that can read and write information on a corresponding magnetic surface of a spinning disk. For convenience, all heads that can read are referred to as "read heads" or "heads" herein, regardless of other devices and functions the read head may also perform (e.g. writing, micro-actuation, flying height control, touch down detection, lapping control, localized disk media heating, etc). Each read head is a sub-component of a head gimbal assembly (HGA). The HGA also includes a suspension assembly for holding the head and providing a plurality of electrical connections thereto. The suspension assembly typically includes a fragile laminated flexure to carry the electrical signals to and from the head.

The head typically comprises a slider that includes an air bearing surface (ABS) that faces the magnetic disk surface and a trailing face. A magnetic transducer and a plurality of head bond pads are typically disposed on the trailing face of the slider. The mounting face of the slider is typically permanently bonded to a tongue portion of the fragile laminated flexure by an adhesive, in a position such that the plurality of head bond pads are aligned with corresponding bond pads on the laminated flexure.

Conventionally, the magnetic transducer on the trailing face of the slider can write tiny magnetic transitions on the magnetic disk surface by applying sufficient magnetic field to a desired microscopic disk surface location, to overcome the coercivity of the disk surface material there and thereby change the remnant field there. The magnetic transducer also includes a read sensor that must be capable of sensing magnetic transitions written along very narrow concentric tracks around the disk surface. For example, the width of the read sensor may be required to be less than 50 nm in modern magnetic recording applications. As the areal density of data written on magnetic disk media further increases, ever-narrower read sensors are required.

Conventional methods to fabricate read sensors of narrow width may suffer from inadequate cleaning of photo mask residue and/or undesirable metal re-deposition or corrosion during certain manufacturing steps, leading to unreliability in ultimately producing the desired read sensor widths. Accordingly, there is a need in the art for improved methods to reliably fabricate very narrow read transducers (e.g. with read widths of 30 nm or less) for magnetic heads, practical for high volume manufacturing with acceptable yield and cost.

DESCRIPTION OF EXAMPLE EMBODIMENTS

Figure 1:
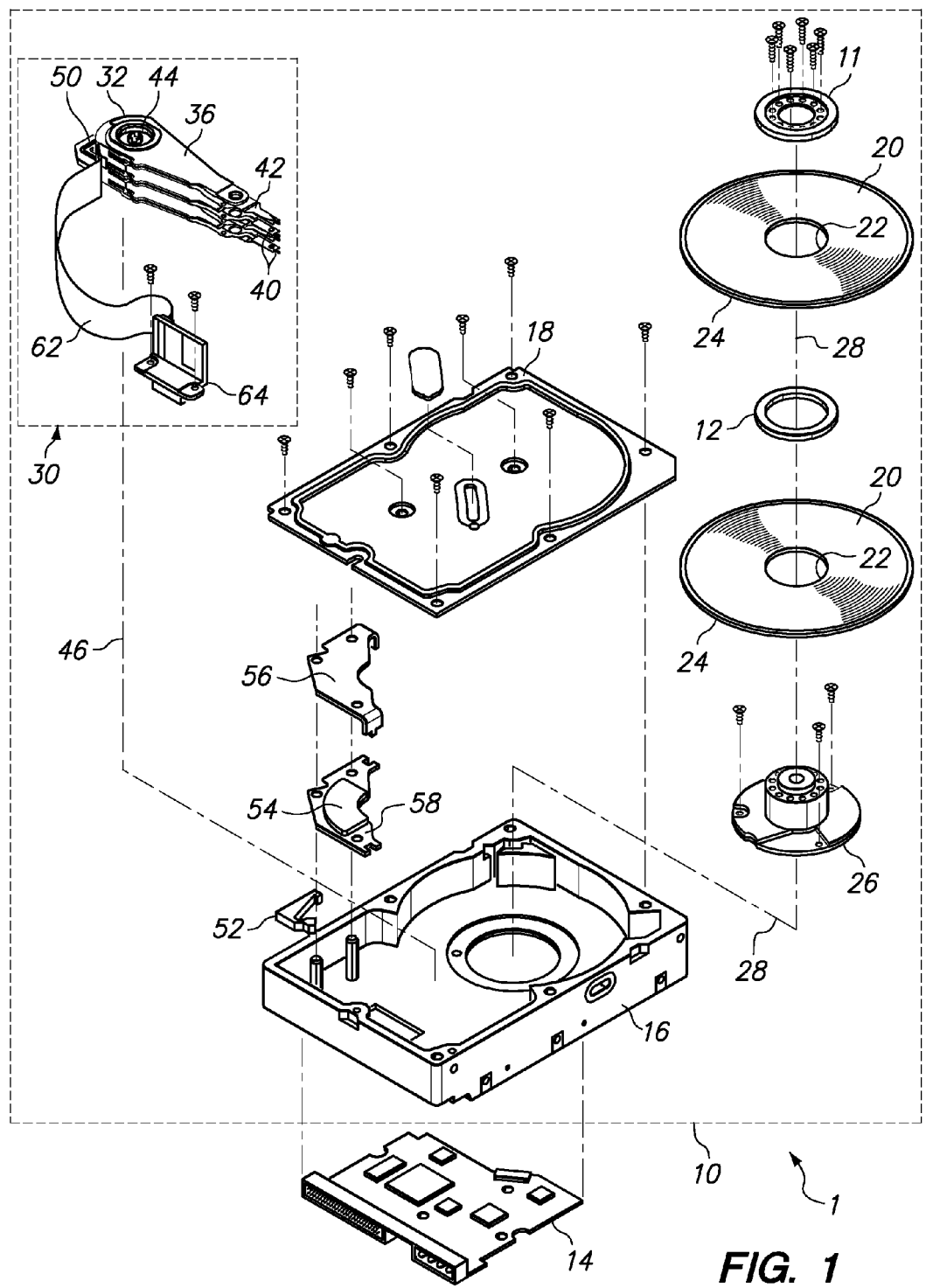
FIG. 1 is an exploded perspective view of a disk drive capable of including read heads fabricated according to an embodiment of the present invention.

FIG. 1 is an exploded perspective view of a disk drive 1 including read heads 40 that may be fabricated according to an embodiment of the present invention. The disk drive 1 includes a head disk assembly (HDA) 10 and a printed circuit board (PCB) 14. The HDA 10 includes a disk drive base 16 and a disk drive cover 18, that together enclose other components of the HDA 10. At least one disk 20 is rotatably mounted to the disk drive base 16 by a spindle motor 26. The HDA 10 optionally includes one or more additional disks 20, also rotatably mounted to the disk drive base 16 by spindle motor 26, with the disks 20 then separated by one or more spacer rings 12.

The disks 20 may comprise an aluminum, glass, or ceramic substrate, with the substrate optionally being coated with a NiP under-layer, at least one thin-film magnetic layer, a diamond-like amorphous carbon protective layer, and a very thin lubricant layer, for example. The disks 20 are annular in shape, having an outer periphery 24 and an inner periphery 22, and may be clamped to a rotating hub of the spindle motor 26, by a clamp 11. The rotating hub of the spindle motor 26 rotates the disks 20 about a disk axis of rotation 28.

The HDA 10 also includes a head stack assembly (HSA) 30 that includes an actuator 32 that is pivotably mounted to the disk drive base 16 by a pivot bearing 44 that is inserted as a cartridge into a bore in the actuator 32. The pivot bearing 44 allows the actuator 32 to pivot about an actuator pivot axis 46. The actuator 32 may be fabricated from any suitable material having sufficient stiffness to weight, for example aluminum, magnesium, beryllium, or stainless steel. The pivot bearing 44 may be retained in the bore by a tolerance ring or may be otherwise retained (e.g. by an adhesive). The angular range of motion of the actuator 32 may be limited by a latch and crash stop mechanism 52. The actuator 32 includes at least one actuator arm 36 that extends away from the pivot bearing 44, and an actuator coil 50 that extends away from the pivot bearing 44 in a direction generally opposite the actuator arm 36.

The actuator coil 50 may fit in a yoke structure that optionally comprises a top plate 56 and a bottom plate 58, to form a voice coil motor (VCM). One or both of the top plate 56 and the bottom plate 58 may support a permanent magnet(s) of the VCM (e.g. permanent magnet 54). The top plate 56 and/or the bottom plate 58 preferably comprise a ferromagnetic metal so as to provide a return path for magnetic flux from the permanent magnet(s) through the yoke structure. The ferromagnetic metal yoke structure including the top plate 56 and the bottom plate 58 is preferably affixed to the disk drive base 16, for example by an adhesive, one or more fasteners, and/or magnetic attraction.

A plurality of head gimbal assemblies 42 may be attached to arms 36 of the actuator 32, for example by swaging. A flexible printed circuit (FPC) 62 (also known as a "flex cable") may also be attached to the actuator 32. Each of the head gimbal assemblies 42 may include a read head 40 that is bonded to a laminated flexure having a flexure tail that is electrically connected to the FPC 62. The FPC 62 can communicate electrical signals, via these electrical connections and via a flex bracket 64, between the head gimbal assemblies 42 and an external electronic system that is disposed on the PCB 14.

The actuator 32, head gimbal assemblies 42, and FPC 62 all may be considered as components of the HSA 30. The HDA 10 may have additional components that are not shown in FIG. 1. For example, the HDA 10 may also include a conventional head loading ramp (not shown), that may be positioned adjacent the disks 20 to facilitate merging of the head gimbal assemblies 42 onto surfaces of the disks 20.

Figure 2:
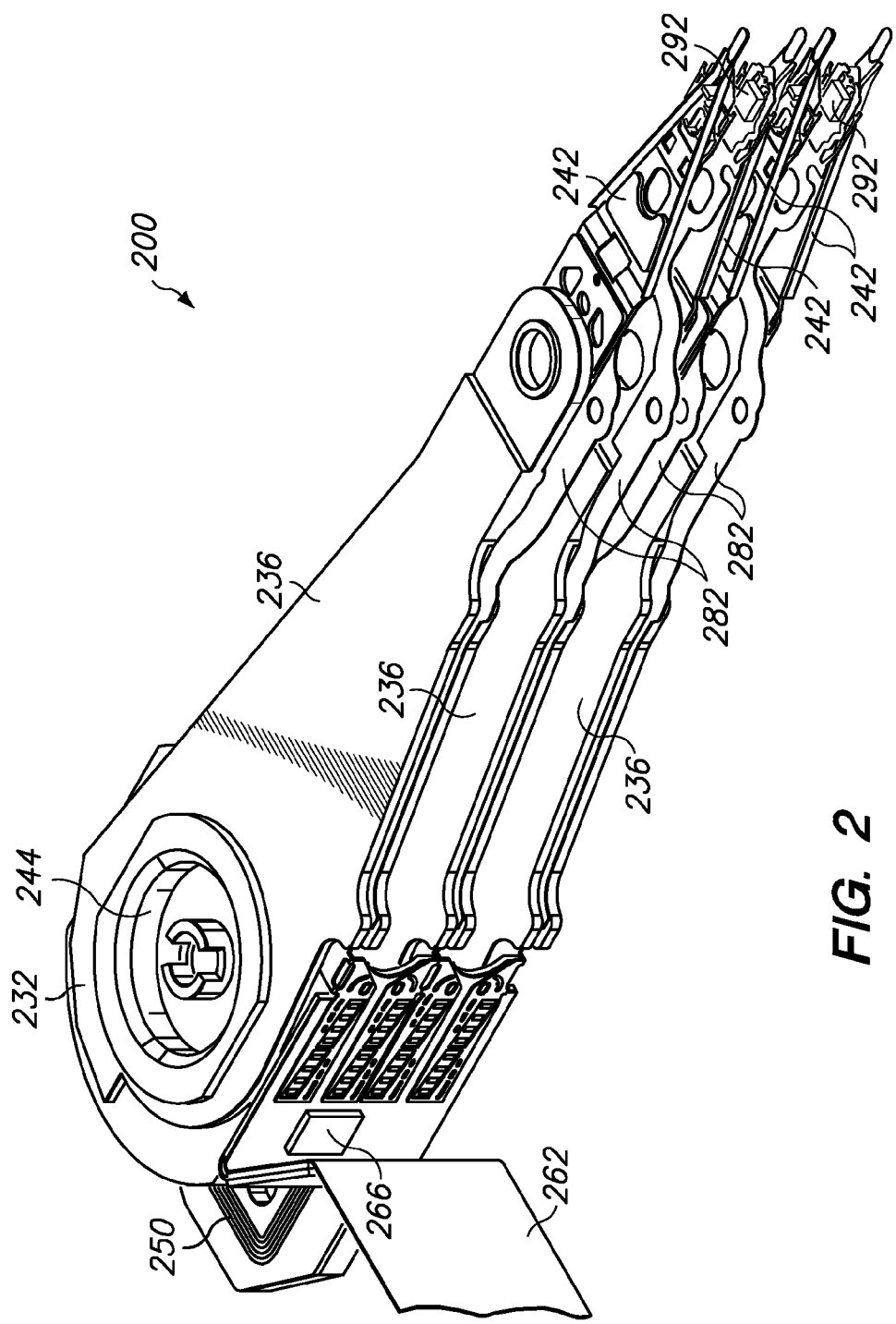
FIG. 2 is a top perspective view of a head stack assembly (HSA), capable of including read heads fabricated according to an embodiment of the present invention.

FIG. 2 is a top perspective view of a head stack assembly (HSA) 200, including read heads 292 that may be being fabricated according to an embodiment of the present invention. The HSA 200 includes an actuator 232 pivotably attachable to a disk drive base by a pivot bearing 244 that is inserted as a cartridge into a bore in the actuator 232. The actuator 232 may be fabricated from a suitable metal such as aluminum, magnesium, beryllium, or stainless steel, or a relatively low mass density non-metallic or composite material having sufficient stiffness. The pivot bearing 244 may be retained in the bore by a tolerance ring or may be otherwise retained (e.g. by an adhesive). The actuator 232 includes a plurality of actuator arms 236 that extends away from the pivot bearing 244, and an actuator coil 250 that extends away from the pivot bearing 244 in a direction generally opposite the actuator arms 236.

In the embodiment of FIG. 2, a plurality of head gimbal assemblies (HGAs) 242 are shown to be attached to arms 236 of the actuator 232. Each HGA includes a read head 292 and a suspension assembly to which the read head 292 is attached. Specifically, each read head 292 is attached and electrically connected to a laminated flexure 282 of the suspension assembly of the HGA 242. The suspension assembly of each HGA 242 is shown to be attached to one of the actuator arms 236, for example by swaging. A flexible printed circuit (FPC) 262 is also shown to be attached to the actuator 232. Each laminated flexure 282 includes a plurality of conductive traces, and each laminated flexure 282 has a flexure tail that extends to the FPC 262, where the plurality of conductive traces is connected to the FPC 262 near a pre-amplifier chip 266.

Figure 3:
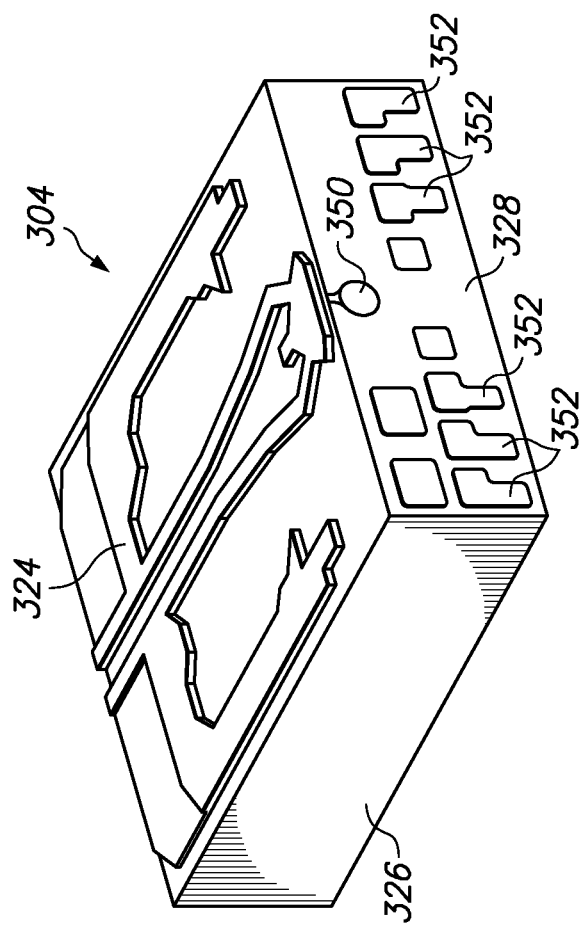
FIG. 3 depicts a read head capable of including a read sensor fabricated according to an embodiment of the present invention, as viewed from a perspective angle towards the air bearing surface of the head.

FIG. 3 depicts a read head 304, as viewed from a perspective angle towards its air bearing surface 324. The read head 304 comprises a slider 326 that includes the air bearing surface 324, and a trailing face 328 that is normal to the air bearing surface 324. The air bearing surface 324 may be of any conventional design, and is not restricted to the design shown in FIG. 3. The head 304 also comprises a plurality of head bond pads 352 that are disposed on the trailing face 328 and that are electrically conductive. The head bond pads 352 may comprise gold and/or copper, for example.

In the embodiment of FIG. 3, a magnetic transducer 350 is disposed on the trailing face of the slider 326. The magnetic transducer 350 may include a magneto-resistive read sensor (e.g. a tunneling magneto-resistive read sensor) fabricated according to an embodiment of the present invention, and a magneto-inductive write transducer, for example. The magnetic transducer 350 may also include other functions and structures, such as a micro-actuator, flying height control heater, a touch down sensor, a lapping guide, and/or a laser guide or mirror for heating a localized region of the disk media. The slider 326 may comprise a ceramic material such as AlTiC, for example.

Figure 4:
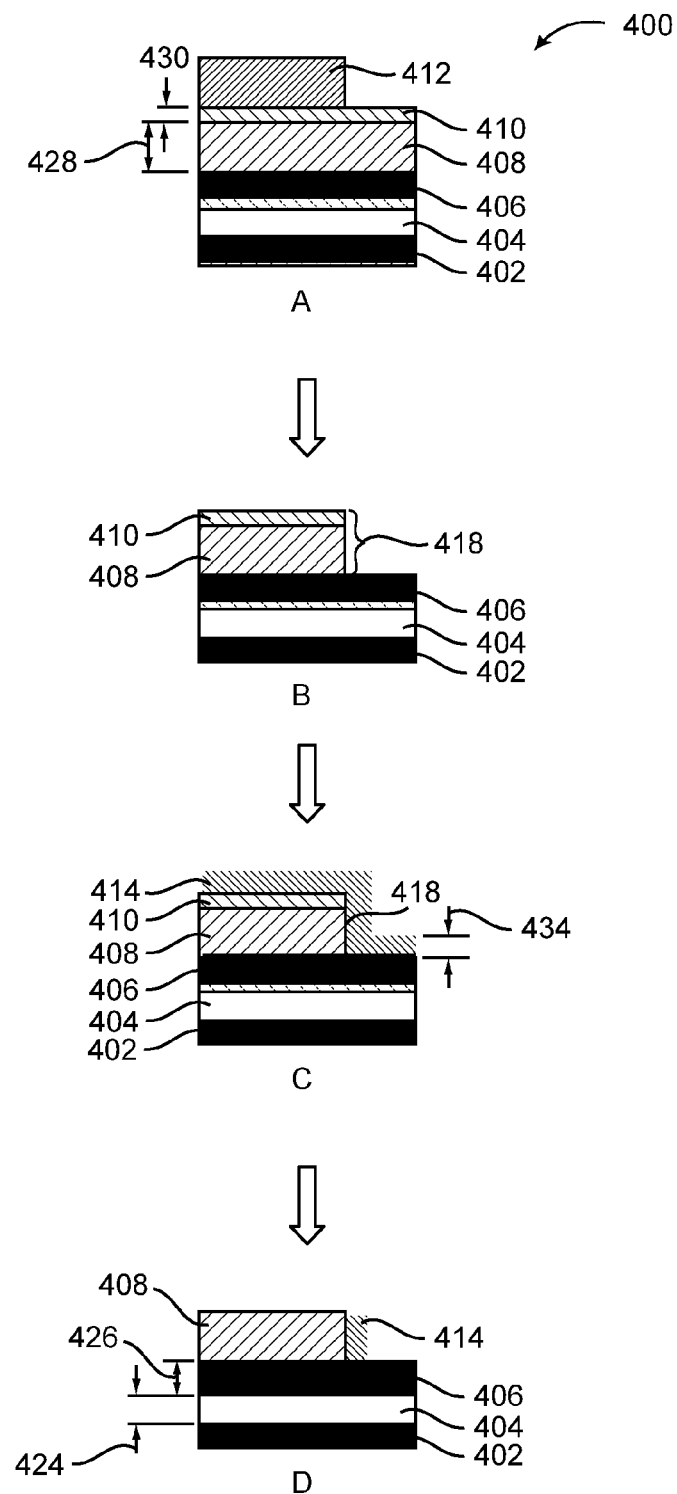
FIG. 4 depicts method steps according to an embodiment of the present invention.
Figure 5:
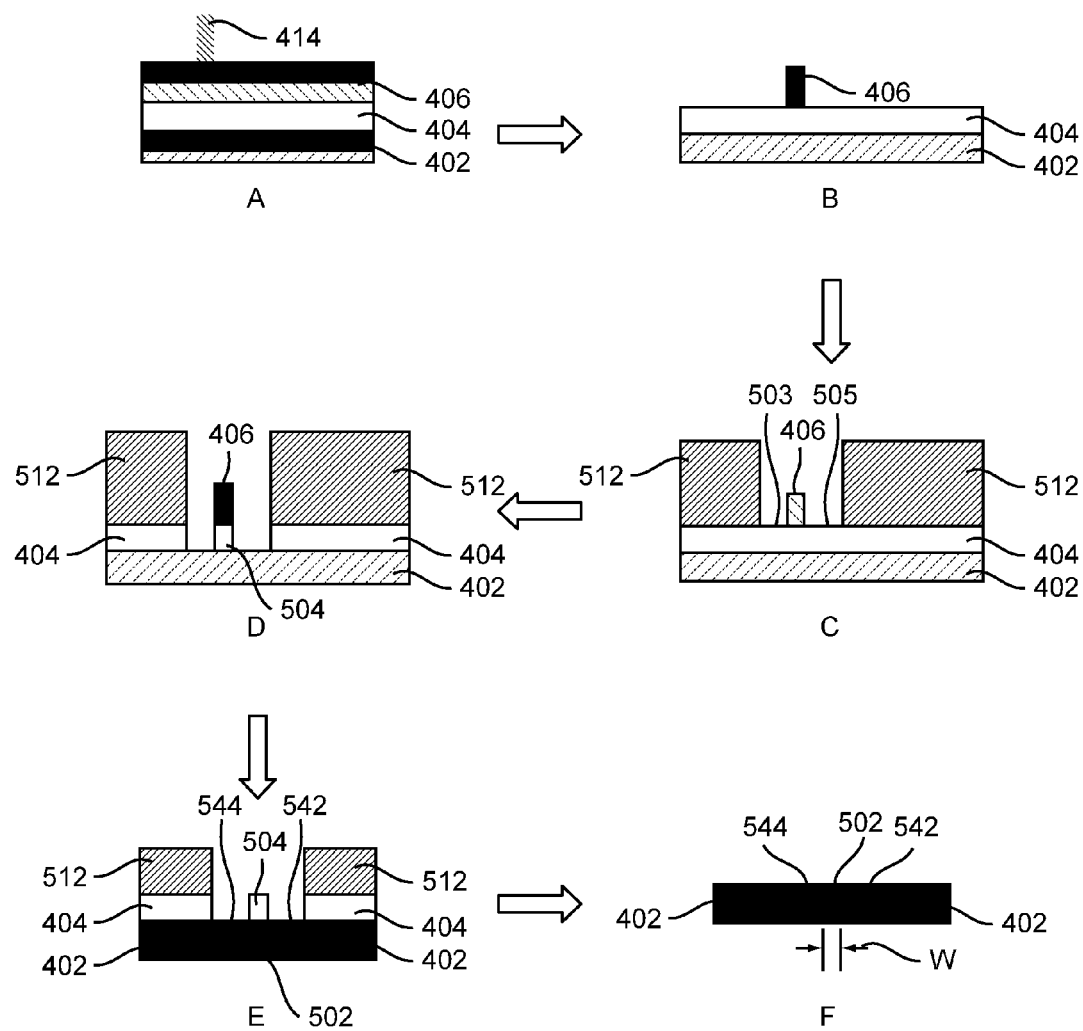
FIG. 5 depicts method steps according to an embodiment of the present invention.

FIG. 4 and FIG. 5 depict steps of a method to manufacture a read sensor for a magnetic head, according to an embodiment of the present invention. Now referring to FIG. 4, a first layered structure 400 is provided, for example by depositing a plurality of layers on to a conventional substrate. In the embodiment of FIG. 4, the first layered structure 400 includes a magnetic layer 402, that itself may be a tunneling magnetoresistive laminate comprising a plurality of conventional sublayers.

In the embodiment of FIG. 4, a first hard mask layer 404 is shown to be disposed immediately adjacent and contacting the magnetic layer 402. The first layered structure 400 also includes a second hard mask layer 406 immediately adjacent and contacting the first hard mask layer 404. The first layered structure 400 may also include a first stepping layer 408 immediately adjacent and contacting the second hard mask layer 406, and a second stepping layer 410 immediately adjacent and contacting the first stepping layer 408.

In the embodiment of FIG. 4, the first stepping layer 408 may optionally comprise amorphous carbon. The first stepping layer 408 is shown in FIG. 4 to have a thickness 428 that, in certain embodiments, may preferably be in the range of 20 nm to 200 nm. In the embodiment of FIG. 4, the second stepping layer 410 is shown to have a thickness 430 that, in certain embodiments may preferably be in the range of 1 nm to 10 nm. In certain embodiments, the second stepping layer 410 may preferably comprise a material that is not easily removed by an oxygen plasma etching process, such as tantalum, silicon oxide, chromium, silicon nitride, or ruthenium.

In the embodiment of FIG. 4 (prior to step A→B), a patterned photoresist layer 412 is shown to be immediately adjacent and contacting the second stepping layer 410, although in embodiments having only the first stepping layer 408 and not the optional second stepping layer 410, the patterned photoresist layer 412 may be immediately adjacent and contacting the first stepping layer 408.

In step A→B of FIG. 4, the first and second stepping layers 408 and 410 are shown to have been etched through to create a sidewall 418 of the first and second stepping layers 408, 410. For example, the second stepping layer 410 may be ion milled or etched away where exposed (i.e. where not protected from the ion milling by the patterned photoresist layer 412). Also for example, the first stepping layer 408 may be etched to create the sidewall 418 by reactive ion etching, for example using oxygen plasma. The patterned photoresist layer 412 is removed after etching through the second stepping layer 410 during the process of creating the sidewall 418, and therefore the patterned photoresist layer 412 is absent after step A→B of FIG. 4. In step A→B of FIG. 4, the total height of the sidewall 418 is shown to equal the sum of the thickness 428 of the first stepping layer 408 plus the thickness 430 of the second stepping layer 410.

In step B→C of FIG. 4, a mask-width definition layer 414 is deposited on and adjacent to the sidewall 418, until a mask-width definition layer thickness 434 is achieved adjacent to the sidewall 418. In certain embodiments, the mask-width definition layer thickness 434 is preferably less than 30 nm, for example in the range of 3 nm to 30 nm. In certain embodiments, the mask-width definition layer 414 optionally may comprise alumina, silicon dioxide, or silicon nitride. As will be described herein, the thickness 434 of the mask-width definition layer can be determinative of the reader width according to certain embodiments of the inventive method.

In step C→D of FIG. 4, the mask-width definition layer 414 is removed except on the sidewall 418, for example by ion etching (e.g. ion milling or reactive ion etching). Optionally, and as shown in step C→D of FIG. 4, the mask-width definition layer 414 removal step may also remove the second stepping layer 410. If not, the second stepping layer 410 may be removed as a separate step either before or during the removal of the first stepping layer 408, which may leave a narrow portion of the mask-width definition layer 414 as shown before step A→B of FIG. 5. In certain embodiments, oxygen plasma is used to remove the first stepping layer 408, for example if the first stepping layer 408 comprises amorphous carbon.

As shown in FIG. 4, the first hard mask layer 404 has a thickness 424 that, in certain embodiments, may preferably be in the range of 10 nm to 50 nm. In certain embodiments, the first hard mask layer 404 may preferably be a material removable by etching with an oxygen plasma, such as amorphous carbon (e.g. diamond-like carbon), or a cured photoresist material (e.g. baked above the cross-link temperature to lose photo-sensitivity). The second hard mask layer 406 has a thickness 426 that, in certain embodiments, may preferably be in the range of 5 nm to 50 nm. In certain embodiments, the second hard mask layer 406 may preferably comprise silicon carbide. Silicon dioxide or silicon nitride may also be used for the second hard mask layer 406, so long as the material is different from that of the mask width definition layer 414.

In the step A→B of FIG. 5, the second hard mask layer 406 is etched away (for example using reactive ion etching), except for a remainder of the second hard mask layer 406 that was beneath the narrow portion of the mask-width definition layer 414. The narrow portion of the mask-width definition layer 414 is also removed, for example by wet etching.

In the step B→C of FIG. 5, a patterned partial over-layer of photoresist material 512 optionally may be deposited on the first hard mask layer 404, so that only exposed regions 503 and 505 of the first hard mask layer 404 are exposed, the exposed regions 503 and 505 being separated from each other by the narrow remainder of the second hard mask layer 406.

In the step C→D of FIG. 5, the exposed regions 503 and 505 of the first hard mask layer 404 are etched away around the remainder of the second hard mask layer 406, for example using oxygen plasma. Such etching defines a remainder 504 of the first hard mask layer 404 beneath the remainder of the second hard mask layer 406. A dual layer hard mask is thereby formed, comprising the remainder of the second hard mask layer 406 and the remainder 504 of the first hard mask layer 404.

In the step D→E of FIG. 5, the magnetic layer 402 is ion milled around the dual hard mask 406, 504 to define a reader stripe 502. In certain embodiments, ion milling the magnetic layer 402 round the dual hard mask 406, 504 also erodes away the remainder of the second hard mask layer 406, with less undesirable metal re-deposition than prior methods. Hard bias or soft bias material 542 and 544 may then be optionally back-filled into the voids left by the ion milling of the magnetic layer 402.

In the step E→F of FIG. 5, the patterned partial over-layer of photoresist material 512 may be removed by a conventional photoresist material removal process, and the first hard mask layer 404 (including the remainder 504) may also be removed, for example using oxygen plasma. In certain embodiments, such removal of the first hard mask layer 404 by oxygen plasma may obviate the need for a cleaning step (to otherwise remove residue from the patterned photoresist material over-layer 512). In certain embodiments, the ability to remove the first hard mask layer 404 by oxygen plasma may reduces corrosion of the magnetic layer 402 and the reader stripe 502 (relative to the corrosion that might be induced by the use of a fluorine plasma). The reader stripe 502 is shown in FIG. 5 to have a reader width w, which one of ordinary skill will recognize depends substantially upon the mask-width definition layer thickness 434 shown in FIG. 4.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A method to manufacture a magnetic head, the method comprising:
   providing a first layered structure including a magnetic layer, a first hard mask layer immediately adjacent and contacting the magnetic layer, a second hard mask layer immediately adjacent and contacting the first hard mask layer; and a first stepping layer immediately adjacent and contacting the second hard mask layer;
   etching through the first stepping layer to create a sidewall of the first stepping layer;
   depositing a mask-width definition layer on and adjacent to the sidewall, until a mask-width definition layer thickness is achieved adjacent to the sidewall;
   removing the mask-width definition layer except on the sidewall;
   removing the first stepping layer;
   etching away the second hard mask layer except for a remainder of the second hard mask layer beneath the mask-width definition layer;
   etching away the first hard mask layer around the remainder of the second hard mask layer to define a remainder of the first hard mask layer beneath the remainder of the of the second hard mask layer, to form a dual layer hard mask comprising the remainder of the second hard mask layer and the remainder of the first hard mask layer; and
   ion milling the magnetic layer around the dual hard mask.

2. The method of claim 1, wherein the first layered structure further comprises a second stepping layer immediately adjacent and contacting the first stepping layer, and wherein the act of etching through the first stepping layer also etches a continuation of the sidewall through the second stepping layer, a total height of the sidewall equaling a sum of a thickness of the first stepping layer plus a thickness of the second stepping layer.

3. The method of claim 2, wherein ion etching is used to etch the sidewall through the first and second stepping layers.

4. The method of claim 2, wherein the second stepping layer comprises tantalum having a thickness in the range of 1 nm to 10 nm.

5. The method of claim 2, wherein providing the first layered structure includes depositing a plurality of layers onto a substrate, the plurality of layers including the magnetic layer, the first hard mask layer, the second hard mask layer, and the first and second stepping layers.

6. The method of claim 1, wherein ion milling the magnetic layer around the dual hard mask defines a reader width of the magnetic head that depends upon the mask-width definition layer thickness.

7. The method of claim 6, wherein the mask-width definition layer thickness and the reader width of the magnetic head are less than 30 nm.

8. The method of claim 1, wherein ion milling the magnetic layer around the dual hard mask also removes the remainder of the second hard mask layer.

9. The method of claim 1, further comprising removal of the remainder of the first hard mask layer using an oxygen plasma, after ion milling the magnetic layer around the dual hard mask.

10. The method of claim 1, further comprising depositing a patterned partial overlayer of photoresist material on the first hard mask layer, before etching away the first hard mask layer around the remainder of the second hard mask layer.

11. The method of claim 1, wherein the first stepping layer comprises amorphous carbon having a thickness in the range of 20 nm to 200 nm.

12. The method of claim 1, wherein the first hard mask layer comprises amorphous carbon having a thickness in the range of 10 nm to 50 nm.

13. The method of claim 12, wherein oxygen plasma is used for etching away the first hard mask layer around the remainder of the second hard mask layer.

14. The method of claim 1, wherein the second hard mask layer comprises silicon carbide having a thickness in the range of 5 nm to 50 nm.

15. The method of claim 14, wherein the mask-width definition layer comprises silicon dioxide having a thickness in the range of 3 nm to 30 nm.

16. The method of claim 1, wherein the mask-width definition layer comprises alumina having a thickness in the range of 3 nm to 30 nm.

17. The method of claim 16, wherein the second hard mask layer comprises silicon dioxide or silicon nitride.

18. The method of claim 1, wherein the magnetic layer is a tunneling magnetoresistive laminate comprising a plurality of sublayers.

19. The method of claim 1, wherein the first hard mask layer comprises a cured photoresist material.

20. The method of claim 1, wherein reactive ion etching is used to remove the mask-width definition layer except on the sidewall.

* * * * *